Oct. 4, 1932.                G. A. SMITH                1,881,033
                          VEHICLE TURNTABLE
               Filed March 5, 1930      4 Sheets-Sheet 1

Inventor
George A. Smith.
by Hazard and Miller
Attorneys

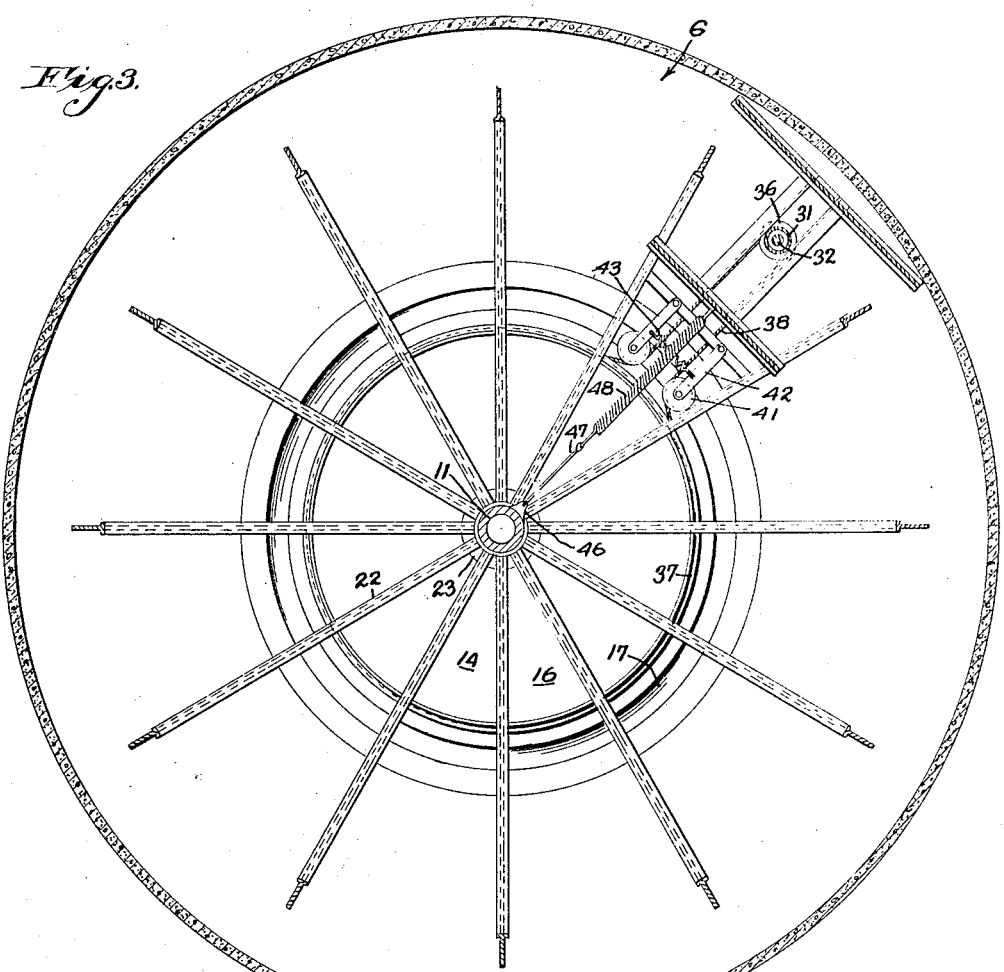
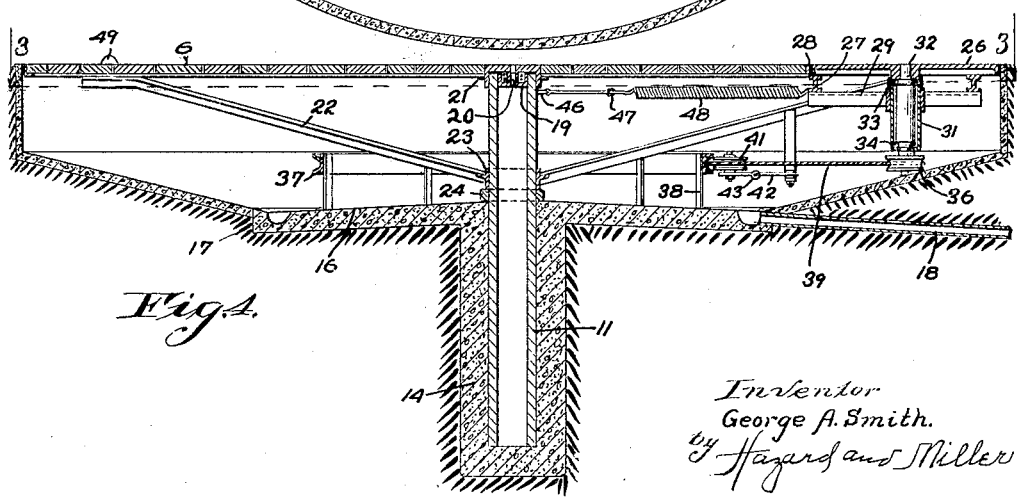

Oct. 4, 1932.  G. A. SMITH  1,881,033
VEHICLE TURNTABLE
Filed March 5, 1930  4 Sheets-Sheet 4
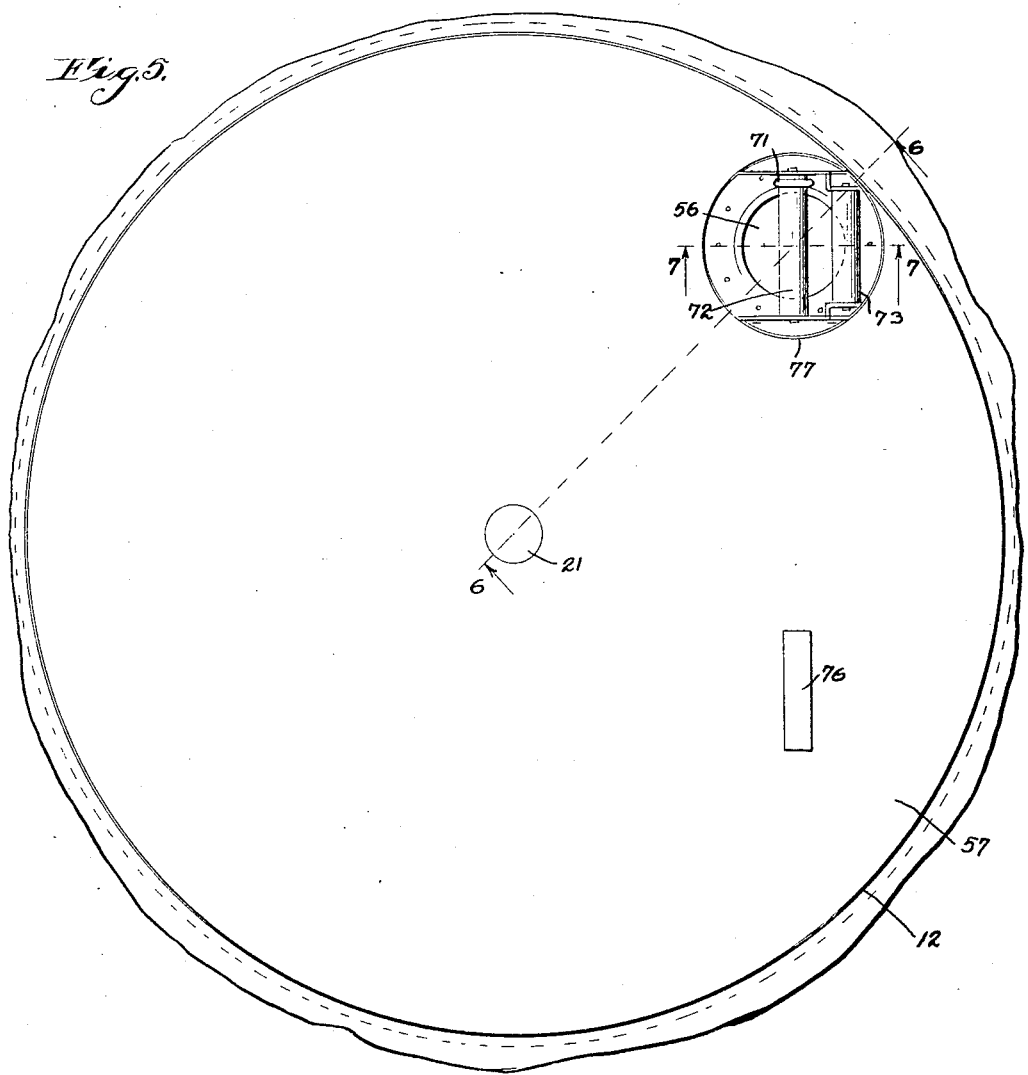
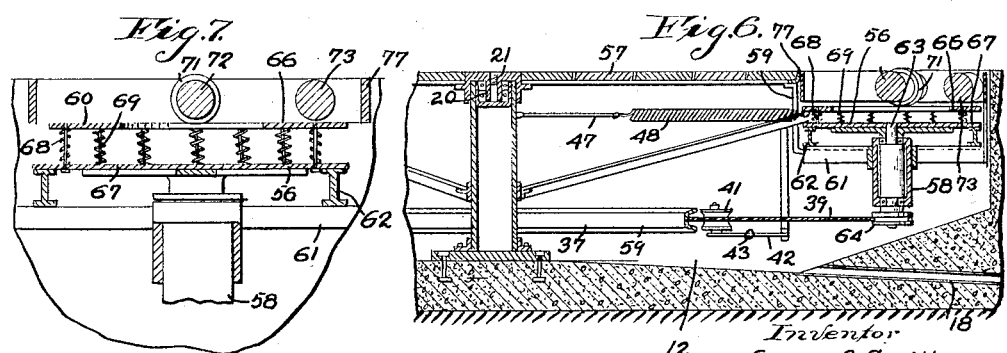

Patented Oct. 4, 1932

1,881,033

UNITED STATES PATENT OFFICE

GEORGE A. SMITH, OF LYNWOOD, CALIFORNIA, ASSIGNOR, BY DIRECT AND MESNE ASSIGNMENTS, TO GEORGE A. SMITH TURNTABLE CORPORATION, LTD.

VEHICLE TURNTABLE

Application filed March 5, 1930. Serial No. 433,397.

My invention is a turntable adapted for use in manipulating vehicles such as automobiles.

An object of the invention, is the provision of a turntable for automobiles, characterized by its being provided with driving means whereby the turntable may be operated by power derived from the vehicle supported upon the turntable.

A more detailed object is the provision of a turntable adapted to receive its energizing influence from the vehicle being turned thereby, and which is so arranged that an automobile may be driven thereupon, and the turntable then operated to turn the automobile into a different direction, and the automobile then driven off the turntable without the necessity of the drivers leaving the automobile, and without manipulating any controls other than those of the automobile itself.

Another object is the provision of means for returning the turntable to initial position after the automobile has been driven off the turntable.

A further object is the provision of a turntable device as described, which is particularly adapted for use in conjunction with either private or commercial storage garages, and by the use of which the manipulation of automobiles into and out of their respective storage spaces, is materially facilitated.

A still further object is the provision of an automobile turntable as described, which is of an exceedingly simple and rugged nature, and which is possessed of a minimum number of parts, with a consequent decrease in any liability of the device becoming incapacitated for service.

The invention possesses other objects and advantageous features, some of which, with those enumerated, will be set forth in the following description of the invention's particular embodiment which is illustrated in the drawings accompanying and forming a part of the specification.

Referring to the drawings:

Fig. 3 is a horizontal sectional view taken upon the line 3—3 of Fig. 4, with the direction of view as indicated;

Fig. 4 is a vertical sectional view taken upon the line 4—4 of Fig. 2, with the direction of view as indicated;

Fig. 5 is a top plan view of a slightly modified form of my turntable.

Fig. 6 is a vertical sectional view taken radially of the turntable upon the line 6—6 of Fig. 5, with the direction of view as indicated.

Fig. 7 is an enlarged detail view in vertical section taken upon the line 7—7 of Fig. 5, with the direction of view as indicated.

In terms of broad inclusion, the vehicle turning device of the present invention, comprises a turntable suitably journalled for rotation about a vertical axis, and so arranged that a vehicle such as an automobile, may be moved thereupon, and then the turntable rotated so as to head the vehicle in a new direction. The energy necessary for turning the turntable, is derived from the vehicle itself, the turntable being provided with driving means substantially flush with the remainder thereof, and upon which one of the driving wheels of the vehicle may be positioned when the vehicle is brought to rest upon the turntable, and means associated with the driving means for effecting rotary movement of the turntable as the driving means is rotated by the driving wheel of the vehicle. Means are also provided for returning the turntable to initial position after removal of the automobile therefrom.

Figure 1:
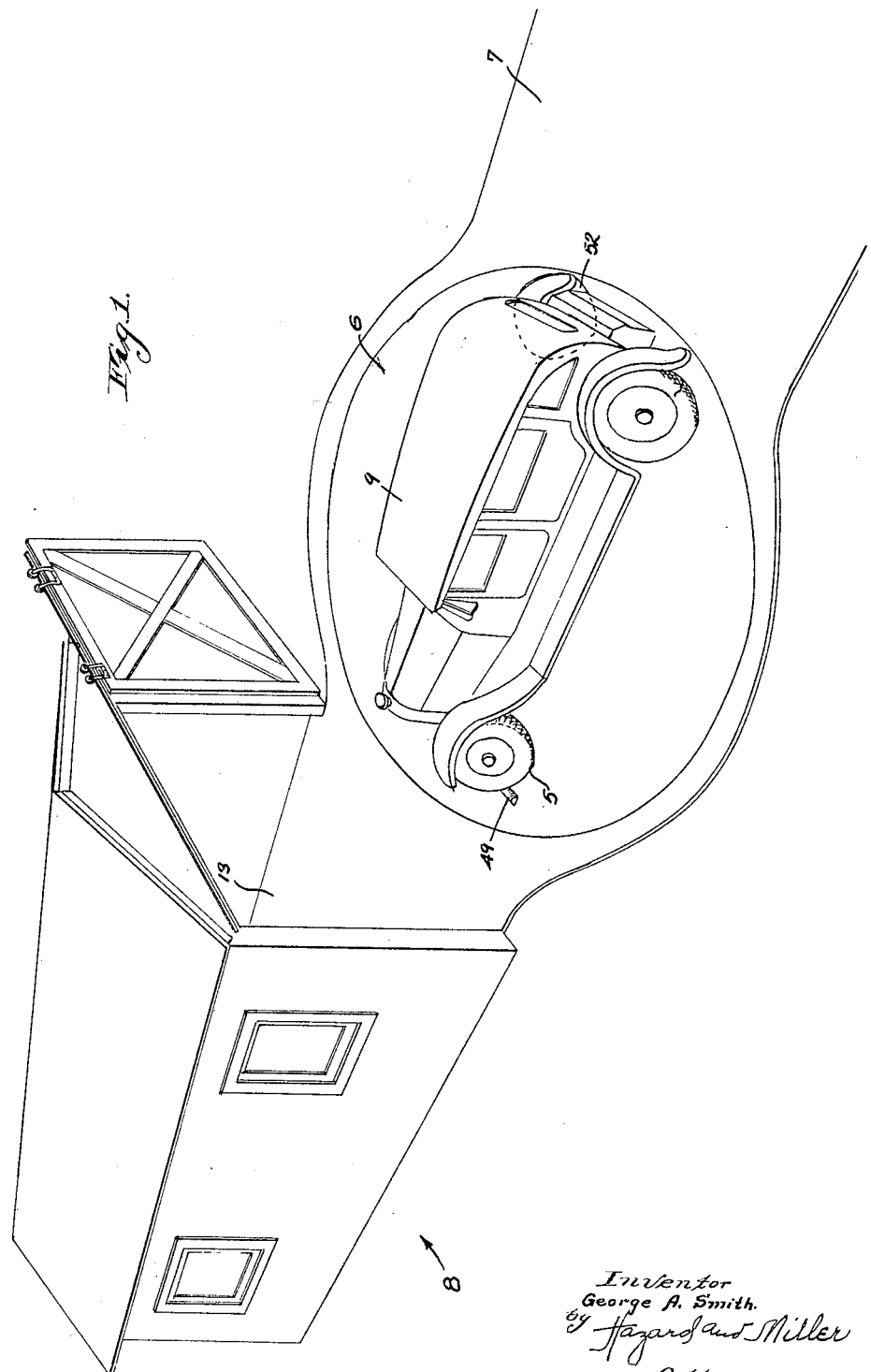
Figure 1 is a perspective view of an automobile and its storage garage, the automobile being shown upon a turntable incorporating the principles of the present invention.

Specifically describing one embodiment of the invention, Fig. 1 shows a turntable 6 operatively mounted within a driveway 7 leading to a storage garage indicated in its entirety at 8. The turntable 6 is so proportioned that an automobile 9 may be driven thereupon from the driveway 7, and then turned through 180°, whereupon the automobile 9 may be backed from the turntable 6, into the garage 8. It will be appreciated however, that whereas the present modification of the invention is shown in conjunction with a private garage 8, the turning device of the present invention, is equally well suited for use in conjunction with commercially operated garages wherein spaces are provided for simultaneously storing a plurality of automobiles 9.

The turntable 6 is mounted for rotary movement about a supporting column 11 which is disposed vertically and at the center of a circular pit 12 formed in the driveway 7, preferably adjacent the opening 13 in the garage 8 through which the vehicle 9 is to be driven when entering or leaving the garage. The column 11 is anchored in any suitable manner, it being herein shown and described as being set within a block of concrete 14, to impart a sufficient degree of rigidity and strength thereto. The block 14 is enlarged at the upper end to form a floor 16 for the pit 12, there being an annular groove 17 at the lowermost portion of the floor 16, serving as a sump, and having a drain tube 18 leading therefrom to any suitable location so as to conduct from the pit 12, any liquid that would otherwise collect therein.

The turntable 6 is circular in plan, and of slightly smaller diameter than the pit 12. The weight of the turntable 6, and any load supported thereupon, is imposed upon the column 11, by means of a thrust bearing 19 interposed between the top of the column 11 and a cap 21 arranged centrally of the turntable 6. The bearing 19 also serves as a radial bearing to prevent the turntable from moving out of coaxial alinement with the column 11 inasmuch as the cap is provided with an axial extension 20 preferably integral therewith which extends downwards from the under surface of the cap and axially therethrough and into engagement with the bearing 19 which is disposed inside the tubular column 11, as disclosed upon Figs. 4 and 6. The parts are so proportioned and arranged that when the turntable 6 is mounted in this manner, upon the column 11, the turntable 6 lies flush with the edge of the pit 12, and hence with the surface of the driveway 7. A plurality of braces 22 radiate from a collar 23 which is mounted for rotary movement upon the column 11, preferably adjacent the floor 16 of the pit 12, these braces 22 extending upwards and secured to the under surface of the turntable 6 adjacent the peripheral edge thereof. A stationary collar 24 is secured to the column 11, in position to absorb any downward thrust exerted by the rotary collar 23, and thus impart additional strength to the entire structure.

Figure 2:
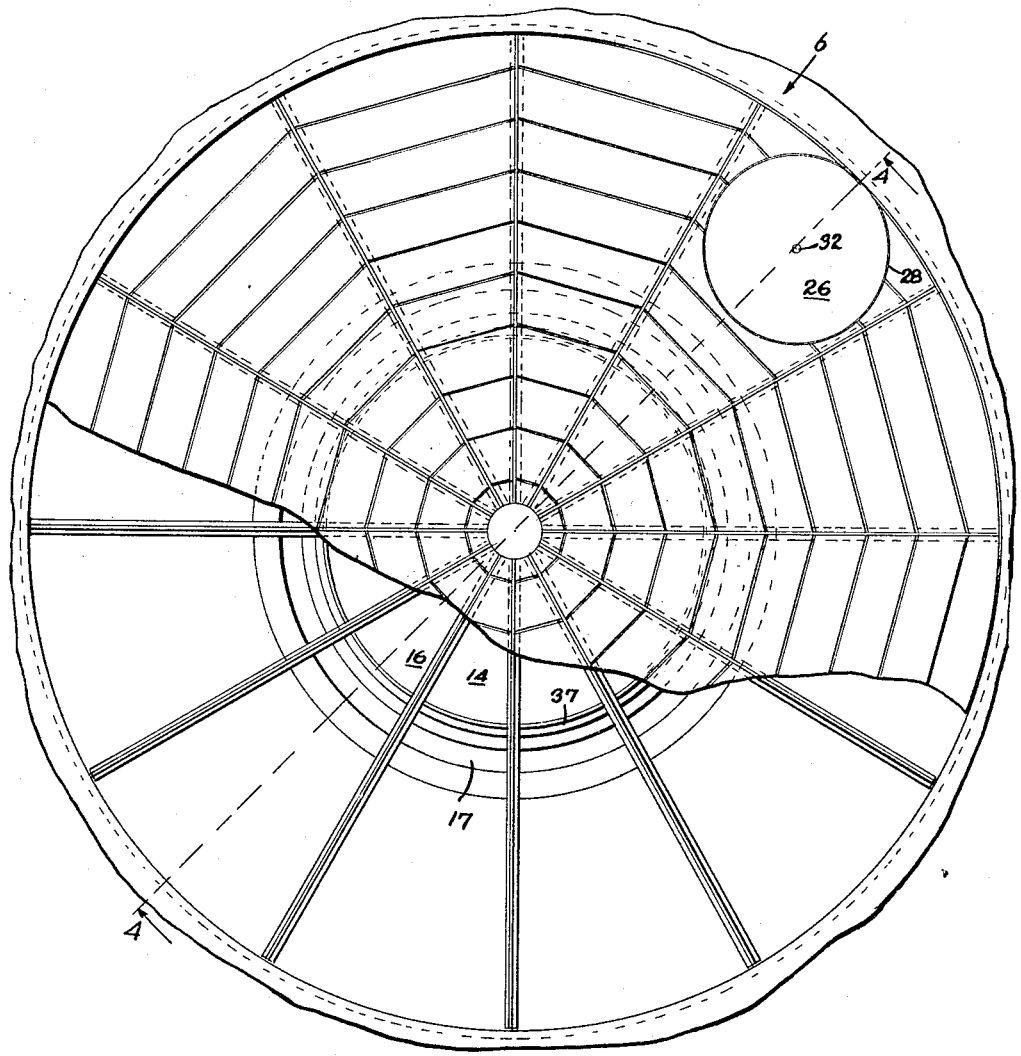
Fig. 2 is a top plan view of the turntable portions of the figure being broken away to better disclose the construction thereof.

A driving table 26 is provided in the turntable 6, and is so arranged that its upper surface lies flush with that of the rotary table. The driving table 26 is positioned closely adjacent or actually tangent with the periphery of the turntable 6, as clearly shown upon Figs. 2 and 4. The driving table 26 is supported by means of beams 27 secured to the under side of the turntable 6, and extending across the circular aperture 28 within which the driving table 26 is disposed. Cross beams 29 are suspended from the beams 27, and support a vertically arranged tube 31 within which the central shaft 32 of the driving table 26 is coaxially disposed. Anti-friction bearings 33 and 34 are interposed between the tube 31 and the shaft 32, so as to properly support the driving table 26 for rotary movement within the aperture 28.

A pulley 36 is secured to the lower end of the shaft 32, so as to be rotated with the driving table 26. A relatively large stationary pulley 37, which may be in the form of a circularly arranged channel, is firmly mounted within the pit 12 below the turntable 6 and in axial alignment therewith, a plurality of brackets 38 being utilized to properly secure the pulley 37 to the floor 16 of the pit 12. A belt 39, which may be of any suitable type such as a rope, cable, or chain, is mounted upon both pulleys 36 and 37, and a proper degree of tension is maintained upon the belt 39, through the expedient of preferably a pair of idler pulleys 41, each of which is journalled upon the free end of a pivoted bracket 42, there being a coil spring 43 under tension between both brackets 42, tending to draw the pulleys 41 together. It is obvious that when the driving table 26 is rotated, the tension upon one side of the belt 39, will be increased, and decreased upon the other side. However, inasmuch as the pulley 37 is held stationary by its brackets 38, the turntable 6 will be turned, carrying with it the driving table 26 in planetary motion about the axis of the column 11.

An eye 46 is carried by the column 11, preferably adjacent the upper end thereof, and disposed eccentrically in respect thereto. A suitable length of cable 47, is attached to the eye 46, and a coil spring 48 is under tension between one of the beams 27 and the outer end of the cable 47, the cable 47 and the spring 48 being disposed substantially radially in respect to the turntable 6, when idle. A stop 49 in the form of a projection or depression, is disposed upon the upper surface of the turntable 6, substantially diametrically opposite the driving table 26.

The manner of use of the turntable of the present invention, is substantially as follows: When idle, the turntable 6 is disposed with the driving table 26 displaced slightly from that point on the periphery of the turntable 6, which is most distant from the garage 8. This permits the automobile 9 to be driven from the driveway 7 onto the turntable 6, until the front wheels 51 of the automobile, engage the stop 49. This will bring one of the rear, or driving wheels 52, to rest upon the driving table 26, at a point adjacent the periphery thereof. The driver of the vehicle should then so manipulate his controls that power is applied simply to the driving wheels 52. It is obvious that the driving wheel 52 which rests upon the body of the turntable 6, will be held stationary in respect to the vehicle 9, but that the other driving wheel will turn through the expedient of the vehicle's differential (not shown). Since this driving wheel 52 engages the driving table 26 at a point adjacent its periphery, rotation thereof will impart rotation to the driving table 26, to effect rotation of the turntable 6 through the expedient of the belt 39, as explained hereinabove. Inasmuch as the front wheels 51 of the vehicle 9, engage the stop 49, the operator will be enabled to apply power gently to the driving wheels 52, without effecting movement of his vehicle 9 upon the turntable, all the power being thus directed to the driving table 26, to effect rotation of the turntable 6.

This rotation of the turntable 6 and vehicle 9, should be continued until the vehicle 9 is headed into the desired direction. In the present instance, this will be attained when the turntable has been rotated through 180°. The vehicle may then be backed into the garage 8. This is effected by the relatively sudden application of power to the rear wheels 52, inasmuch as the mass of the vehicle 9 alone, is less than the combined mass of the vehicle 9 and turntable 6, the inertia of the turntable 6 being sufficient to permit the driving wheels 52 of the vehicle 9, to move the automobile off the turntable 6, when power is applied suddenly thereto, without effecting further rotation of the turntable 6.

As the turntable 6 is rotated from initial position, the beam 27 to which the spring 48 is attached, will swing about the eye 46. This will cause the cable 47 to become wound upon the column 11, as rotation of the turntable 6 is continued. Therefore, when the vehicle 9 is removed from the turntable 6, the energy stored within the spring 48 as the length of the spring is increased due to the winding of the cable 47 upon the column 11, will cause the turntable 6 to return to initial position, bringing the turntable 6 to rest when the point on the beam 27 at which the spring 48 is attached, is in radial alignment with the eye 46.

Figs. 5, 6, and 7, show a slightly modified form of construction wherein the driving table 56, instead of lying flush with the top of the turntable 57, lies in a plane considerably therebelow. Consequently, the bearing tube 58 in which it is journalled for rotation about a vertical axis, is supported through the expedient of brackets 59 and rails 61 and 62, in such a manner that suitable spacing is provided between the plane of the turntable 57 and the upper end of the bearing tube 58. The driving table 56 is carried by a vertically disposed shaft 63, to the lower end of which a pulley 64 is attached, the cable 39 which encircles the large stationary pulley 37, being engaged with the pulley 64 in the same manner as in the previously described modification.

However, the driving table 56 comprises upper and lower discs 66 and 67 respectively, the latter of which is rigidly secured to the shaft 63. The upper disc 66 is supported upon the lower disc 67, through the expedient of a plurality of vertically disposed guide pins 68 encircled by coil springs 69 under compression between the two discs 66 and 67. The action of the springs 69 is to press the upper disc 66 upwards into frictional contact with a preferably resilient annular flange 71 which is carried by one of two rollers 72 and 73 thereabove. These rollers 72 and 73 are mounted for rotation about axes which are fixed with respect to the turntable 57, and are so arranged that their upper sides lie substantially flush with the upper face of the turntable 57. Preferably, the roller 72, which carries the friction flange 71, extends substantially diametrically with respect to the driving table 56.

A stop 76 is arranged upon the opposite side of the turntable 57 from the circular aperture 77 within which the driving table 56 is arranged, this stop 76 being substantially in alignment with that roller 72 proximal to the center of the turntable 57.

This modification of the invention is used in the same manner as that previously described, and it eliminates the large amount of the friction developed between the tire of an automobile and the driving table. The driving table is necessarily relatively small, with the result that the radical distance from the point of contact of the driving wheel 52 to the axis about which the driving table rotates, is also quite small. Moreover, a considerable area of contact between the tire and the driving table exists, with the result that a relatively great amount of friction is developed when the driving table is rotated by the drive wheel about perpendicular axes. Particularly true is this in the case of automobiles equipped with balloon tires, because of the greater area of contact between such a tire and the surface upon which it is supported. However, this difficulty is largely eliminated by the modification last described, inasmuch as the driving wheel 52 is supported upon the two rollers 72 and 73 which rotate about axes parallel with that of the driving wheel 52. Rotary motion is imparted to the driving table 56 because of the engagement of the relatively narrow flange 71 with the upper surface of the disc 66; and inasmuch as the flange 71 is so much narrower than an automobile tire, the amount of friction developed is practically negligible. The springs 69 serve to maintain suitable driving contact between the upper disc 66 and the flange 71, and the stop 76 serves to maintain the driving wheel 52 in proper position upon the rollers 72 and 73, to insure the automobile's remaining stationary on the turntable 57 during operation thereof.

It is obvious that the turntable of the present invention, will materially facilitate the movement of the automobile 9, into or out of the garage 8. Without a turntable, it is necessary to run the vehicle 9 backwards a distance corresponding to the length of the driveway 7; and this is an operation which is considerably difficult for some drivers. However, when the turntable of the present invention is employed, it is possible to drive the automobile 9 forward until closely adjacent the garage 9, and then turn and back it into the garage 8. Then, whenever it is desired to remove the automobile 9 from from the garage, it may be driven therefrom in a forward direction, obviating the necessity of driving the vehicle backwards for any appreciable distance. Furthermore, the turntable is capable of being operated with the utmost facility and without the necessity of the driver of the vehicle, leaving the car or manipulating any controls other than those of the automobile itself.

It is to be understood that the details of the invention as herein disclosed, are subject to alteration within the spirit or scope of the appended claims.

I claim:

1. In a vehicle turning device, a turntable mounted for rotary movement about a vertical axis and adapted to support a vehicle, driving means journalled upon said turntable and arranged thereon in position to support a wheel of said vehicle, means associated with said driving means for turning said turntable when the driving means is rotated, and resilient means interposed into said turning means.

2. In a vehicle turning device, a turntable mounted for rotary movement about a vertical axis and adapted to support a vehicle, driving means journalled upon said turntable and arranged thereon in position to support a wheel of said vehicle, means associated with said driving means for turning said turntable when the driving means is rotated, and rigid stop means for releasably holding the vehicle with said wheel upon said driving means while said driving means is being rotated thereby.

3. In a vehicle turning device, a turntable mounted for rotary movement about a vertical axis and adapted to support a vehicle, driving means journalled upon said turntable and arranged flush therewith in position to support a wheel of said vehicle, means associated with said driving means for turning said turntable when the driving means is rotated, rigid stop means for releasably holding the vehicle with said wheel upon said driving means while rotated thereby, and means for returning said turntable to initial position after removal of said wheel from said driving means.

4. In a vehicle turning device, a turntable mounted for rotary movement about a vertical axis and adapted to support a vehicle, driving means journalled upon said turntable and arranged flush therewith in position to support a wheel of said vehicle, a stationary pulley disposed below and in axial alignment with said turntable, a driving pulley in planar alignment with said stationary pulley and connected to said driving means to be rotated thereby, a belt carried by said pulleys, and resilient means for imposing tension upon said belt.

5. In a vehicle turning device, a turntable mounted for rotary movement about a vertical axis and adapted to support a vehicle, a horizontally disposed driving roller journalled upon said turntable and arranged flush therewith in position to support a wheel of said vehicle, a stationary pulley disposed below and in axial alignment with said turntable, a driving pulley in planar alignment with said stationary pulley and connected to said driving roller to be rotated thereby, a belt under tension between said pulleys, resilient means imposing tension upon said belt, and means for returning said turntable to initial position after having been displaced therefrom.

6. In a vehicle turning device, a vertical column disposed centrally of a circular pit, a turntable conforming to said pit and lying flush with the edge thereof, means journalling said turntable upon said column, an eye secured eccentrically to said column, and a spring under tension between said eye and point on said turntable at a greater radial distance from said column than the eye.

7. In a vehicle turning device, a turntable mounted for rotary movement about a vertical axis and adapted to support a vehicle, a pair of rollers journalled on said turntable for rotation about horizontal axes and adapted to support a wheel of said vehicle, a disc journalled below said rollers for rotation about a vertical axis, said disc frictionally engaging one of said rollers, and means for turning said turntable when said disc rotates.

8. In a vehicle turning device, a turntable mounted for rotary movement about a vertical axis and adapted to support a vehicle, a pair of rollers journalled on said turntable for rotation about horizontal axes and adapted to support a wheel of said vehicle, a disc journalled below said rollers for rotation about a vertical axis, spring means pressing said disc into frictional engagement with one of said rollers, and means for turning said turntable when said disc rotates.

9. In a vehicle turning device, a turntable mounted for rotary movement about a vertical axis and adapted to support a vehicle, a pair of rollers journalled on said turntable for rotation about horizontal axes and adapted to support a wheel of said vehicle, a resilient flange on one of said rollers, a disc journalled below said rollers for rotation about a vertical axis, spring means pressing said disc into frictional engagement with said flange, and means for turning said turntable when said disc rotates.

10. A vehicle turntable comprising a rigid central column, a cap journaled upon said column adjacent the upper end thereof, a table mounted upon said cap, a plurality of braces secured at their outer ends to said table and inclining downwards and inwards towards said column, and means rotatably mounted upon said column below the upper end thereof and supporting the lower, inner ends of said braces.

11. A vehicle turntable comprising a rigid central column, a cap journaled upon said column adjacent the upper end thereof, a table mounted upon said cap, a plurality of braces secured at their outer ends to said table and inclining downwards and inwards towards said column, a collar encircling said column below the upper end thereof and supporting the inner, lower ends of said braces, and means holding said collar from moving downwards upon said column.

12. A vehicle turntable comprising a rigid central column, a cap journaled upon said column adjacent the upper end thereof, a bearing adjacent the upper end of said column, means rigid with said cap and engaging said bearing to hold said cap in coaxial alinement with said column, a table mounted upon said cap, a plurality of braces secured at their outer ends to said table and inclining downwards and inwards towards said column, a collar encircling said column below the upper end thereof and supporting the inner, lower ends of said braces, and means holding said collar from moving downwards upon said column.

13. In a vehicle turning device, a rigid central supporting column, a turntable, means revolubly mounting said turntable at its center upon said column, said turntable being solely supported upon said column, a pair of rollers journaled on said turntable for rotation about horizontal axes and adapted to support a wheel of a vehicle on said turntable, a disk journaled below said rollers for rotation about a vertical axis, one of said rollers being adapted to frictionally engage said disk at a point offset from the axis of rotation of the disk, and means for turning said turntable when said disk turns.

14. A vehicle turntable comprising a rigid central column, a cap journaled upon said column adjacent the upper end thereof, a collar journaled on the column and spaced below said cap, a table mounted at its center upon said cap, a plurality of braces radiating angularly outwards and upwards from said collar to said table adjacent the periphery thereof, and means holding said cap and collar from moving downwards upon said column.

15. A vehicle turntable comprising a rigid central column, a cap journaled upon said column adjacent the upper end thereof, a collar journaled on the column and spaced below said cap, a table mounted at its center upon said cap, a plurality of braces radiating angularly outwards and upwards from said collar to said table adjacent the periphery thereof, means holding said cap and collar from moving downwards upon said column, driving means journaled upon said turntable and arranged thereupon in position to support a wheel of a vehicle on said turntable, and means associated with said driving means for turning said turntable when the driving means is rotated.

16. A vehicle turntable comprising a rigid central column, a cap journaled upon said column adjacent the upper end thereof, a collar journaled on the column and spaced below said cap, a table mounted at its center upon said cap, a plurality of braces radiating angularly outwards and upwards from said collar to said table adjacent the periphery thereof, means holding said cap and collar from moving downwards upon said column, a pair of rollers journaled on said turntable for rotation about horizontal axes and adapted to support a wheel of a vehicle on said turntable, a disk journaled below said rollers for rotation about a vertical axis, one of said rollers being adapted to frictionally engage said disk at a point offset from the axis of rotation of the disk, and means for turning said turntable when said disk turns.

In testimony whereof I have signed my name to this specification.

GEORGE A. SMITH.